United States Patent [19]

Kawashima

[11] Patent Number: 5,778,312
[45] Date of Patent: Jul. 7, 1998

[54] RADIO SELECTIVE CALL RECEIVER HAVING FUNCTION TO DETECT POWER VOLTAGE

[75] Inventor: Shinichi Kawashima, Tokyo, Japan

[73] Assignee: NEC Corporation, Tokyo, Japan

[21] Appl. No.: 683,414

[22] Filed: Jul. 18, 1996

[30] Foreign Application Priority Data

Jul. 21, 1995 [JP] Japan ................................ 7-184548

[51] Int. Cl.⁶ .................................................. H04B 1/16
[52] U.S. Cl. ......................... 455/343; 455/38.3; 455/574; 340/825.44
[58] Field of Search .................................. 455/343, 38.3, 455/574, 226.1, 226.4, 67.7, 127; 370/311; 340/825.44, 311.1; 341/141, 155

[56] References Cited

U.S. PATENT DOCUMENTS 4,755,816  7/1988  DeLuca .......................... 340/825.44
5,265,271  11/1993  Marko et al. ................... 455/343
5,392,462  2/1995  Komaki .......................... 455/552
5,613,227  3/1997  Maki ............................. 455/127

FOREIGN PATENT DOCUMENTS 4331518  11/1992  Japan.

Primary Examiner—Reinhard J. Eisenzopf
Assistant Examiner—Lee Nguyen
Attorney, Agent, or Firm—Young & Thompson

[57] ABSTRACT

A radio selective call receiver having a function to detect a power voltage according to the present invention compriss an input switch circuit 5 for selecting either a demodulated signal or power voltage and applying its selected signal or voltage to an analog/digital converter 6. A decoder 8 and a control unit 10 judge whether the call number of the receiver is included when output from the A/D converter 6 is the digital demodulated signal. When the call number is included, a call report is made. When output from the A/D converter 6 is the digital voltage signal, it is compared with a reference value. When it is smaller than the reference value, an alarm is given. Since the single A/D converter 6 is used to detect a signal and a reduction in power voltage, it is possible to simplify circuit configuration and save power.

9 Claims, 6 Drawing Sheets

RADIO SELECTIVE CALL RECEIVER HAVING FUNCTION TO DETECT POWER VOLTAGE

BACKGROUND OF THE INVENTION

This invention relates to a radio selective call receiver and, more specifically, to a radio selective call receiver having a function to detect a reduction in power voltage. In a conventional radio selective call receiver (to be referred to as "receiver" hereinafter) such as a pager, a power voltage is converted into a digital signal by an analog/digital converter and compared with a predetermined voltage value by control means within the receiver. When the result of the comparison shows that the power voltage is lower than the predetermined voltage value, the receiver gives an alarm.

Meanwhile, this type of receiver receives, amplifies and modulates an FSK modulated radio signal, for example, which is transmitted from a base station and converts a demodulated signal into a digital demodulated signal at a shaping unit. Thereafter, a call number included in the digital demodulated signal is compared with the call number (ID number) of the receiver and a call report is made when they match.

However, the above receiver has two separate digital signal processing circuits: an analog/digital converter for converting a power voltage into a digital signal and a shaping unit. Therefore, the receiver involves such problems as a large circuit scale and a shortened service life of a battery due to increased power consumption.

SUMMARY OF THE INVENTION

An object of the invention is to simplify the circuit configuration of a radio selective call receiver having a function to detect a power voltage such as a pager and extend the service life of a battery by reducing the power consumption of the receiver.

The radio selective call receiver having a function to detect a power voltage according to the present invention which aims to attain the above object has the following elements. That is, they are radio receiving means for receiving and demodulating a radio signal and outputting the demodulated signal, an input switch circuit for selecting a demodulated signal or a power voltage and applying the selected signal or voltage to an analog/digital converter, the analog/digital converter for converting the demodulated signal into a digital demodulated signal or the power voltage into a digital voltage signal, detection means for detecting a frame corresponding to the ID number of the receiver from the digital demodulated signal from the analog/digital converter, call reporting means for making a call report when it detects the ID number, voltage comparing means for detecting that the digital voltage signal falls below a predetermined voltage value, and alarm means for giving an alarm when the digital voltage signal falls below the predetermined voltage value.

The radio signal receiving and reporting method of the above receiver comprises the following steps. First, power voltage is applied to a radio receiving unit to retrieve or detect a call number during a period in which a radio signal is demodulated, the demodulated signal is converted into a digital demodulated signal by the analog/digital converter, and a specific signal or frame is retrieved or detected from the digital demodulated signal.

During a period other than the above processing period, power voltage is applied to the same analog/digital converter as described above to convert it into a digital voltage signal and it is detected whether the voltage signal falls below a predetermined voltage value. Thereafter, when the call number matches the call number of the receiver included in the specific frame of the digital demodulated signal, a call report is made and when the digital voltage signal falls below the predetermined voltage value, an alarm is given.

In this receiver and the radio signal receiving and reporting method, supply of power voltage to the radio receiving unit is controlled and a received demodulated signal or a power voltage is converted into a digital signal by a single analog/digital converter. Therefore, the circuit configuration of the receiver is simplified and power consumption can be reduced, thereby extending the service life of a battery.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
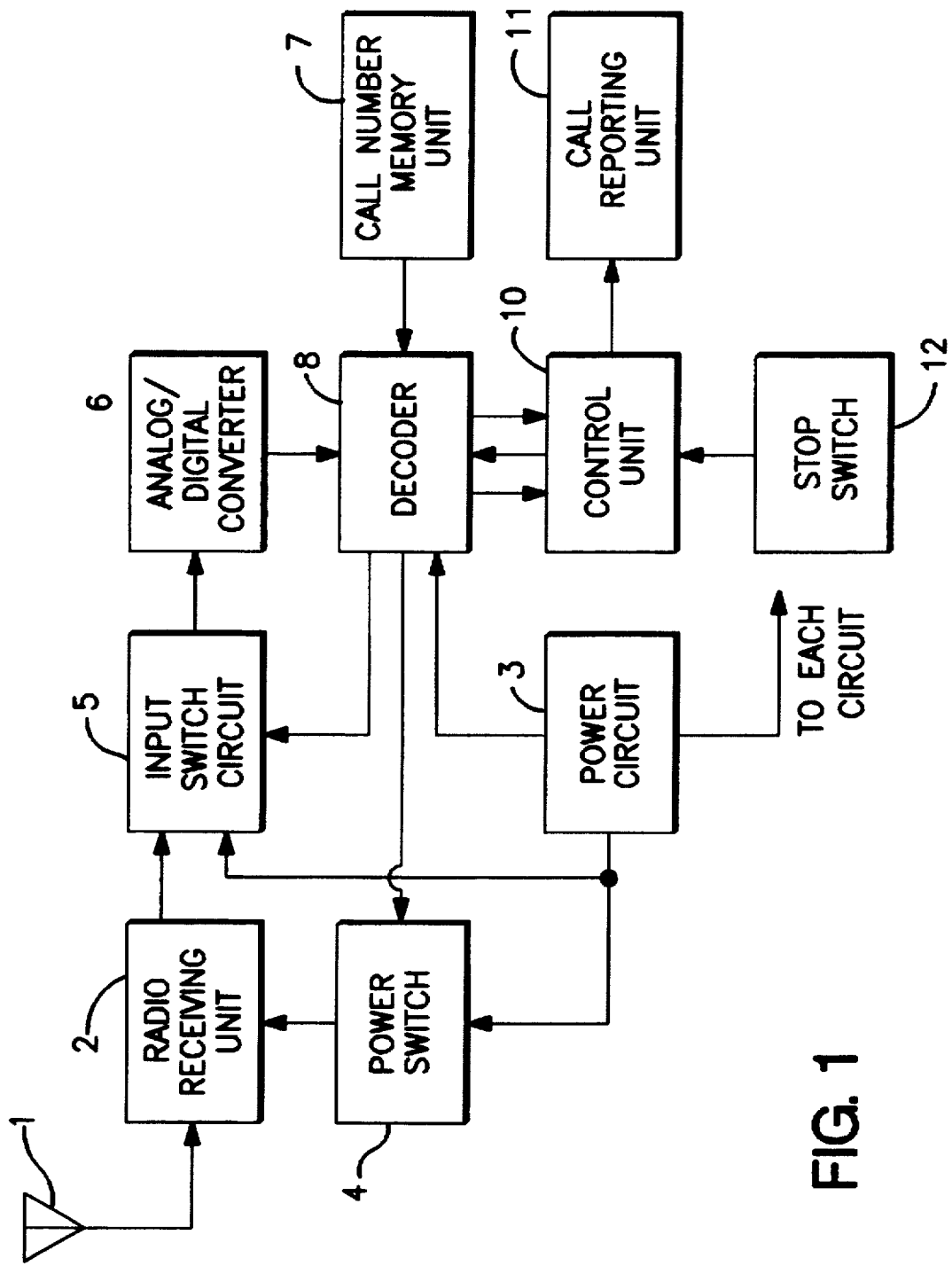
FIG. 1 is a functional block diagram of a radio selective call receiver having a function to detect a power voltage according to an embodiment of the present invention.

First referring to the block diagram of FIG. 1, a radio selective call receiver having a function to detect a power voltage according to a preferred embodiment of the present invention is explained hereinunder.

A radio receiving unit 2 receives a signal (for example, an FSK modulated radio signal) transmitted from a base station through an antenna 1. The received signal is amplified and demodulated, and the thus demodulated signal is supplied to an input switch circuit 5.

A power circuit 3 can supply power voltage to the radio receiving unit 2 through a power switch 4. When the power circuit 3 is turned on, a start signal is supplied to a decoder 8. Based on a signal from the decoder 8, the power switch 4 opens or closes to control supply of power voltage to the radio receiving unit 2. The power circuit 3 is connected to the input switch circuit 5 and supplies power to each circuit. The power circuit 3 can be activated by an unshown power switch.

To the input switch circuit 5 are applied the demodulated received signal and power voltage from the power circuit. The input switch circuit 5 selects the demodulated received signal or the power voltage from the power circuit 3 according to a signal from the decoder 8 and outputs its selected signal or voltage to an analog/digital converter 6 (to be referred to as "A/D converter" hereinafter).

When the A/D converter 6 receives the demodulated signal, it converts the signal into a digital demodulated signal, and when it receives the power voltage, it converts the voltage into a digital voltage signal and outputs its converted signal to the decoder 8.

A call number memory unit 7 stores the call number (ID number) of the receiver and outputs it to the decoder 8.

The decoder 8 receives the digital demodulated signal or the digital voltage signal. When the decoder 8 receives the digital demodulated signal, it establishes synchronization between the received signal and an internal counter based on a preamble signal and a frame sync signal included in the digital demodulated signal. The decoder 8 outputs a count number of the internal counter 803 to a control unit 10 in response to a control signal from a control unit 10. Further, the decoder 8 detects a call number included in the digital demodulated signal and compares it with the call number (ID number) of the receiver stored in the call memory unit 7. When they match, the decoder 8 outputs a match signal to the control unit 10.

When the decoder 8 receives the digital voltage signal, it outputs the signal to the control unit 10. The decoder 8 outputs a radio receiving unit control signal to the power switch 4 and a switch signal to the input switch circuit 5 in response to a control signal from the control unit 10.

The control unit 10 receives a count number of the internal counter 803 from the decoder 8 and outputs a control signal to the decoder 8. When the control unit 10 receives a digital voltage signal, it compares the signal with a predetermined value stored in an unshown internal memory and stores a power voltage reduction signal in the internal memory when the digital voltage signal is smaller than the predetermined value.

When the above match signal and/or the power voltage reduction signal are/is stored in the internal memory, the control unit 10 outputs a report drive signal to a call reporting unit. When the control unit 10 receives a stop signal from a stop switch 12, it stops the output of the report drive signal.

A call reporting unit 11 consists of more than one of a speaker, LED, LCD and vibrator and operates while the report drive signal is applied from the control unit 10.

Figures 2A, 2B:
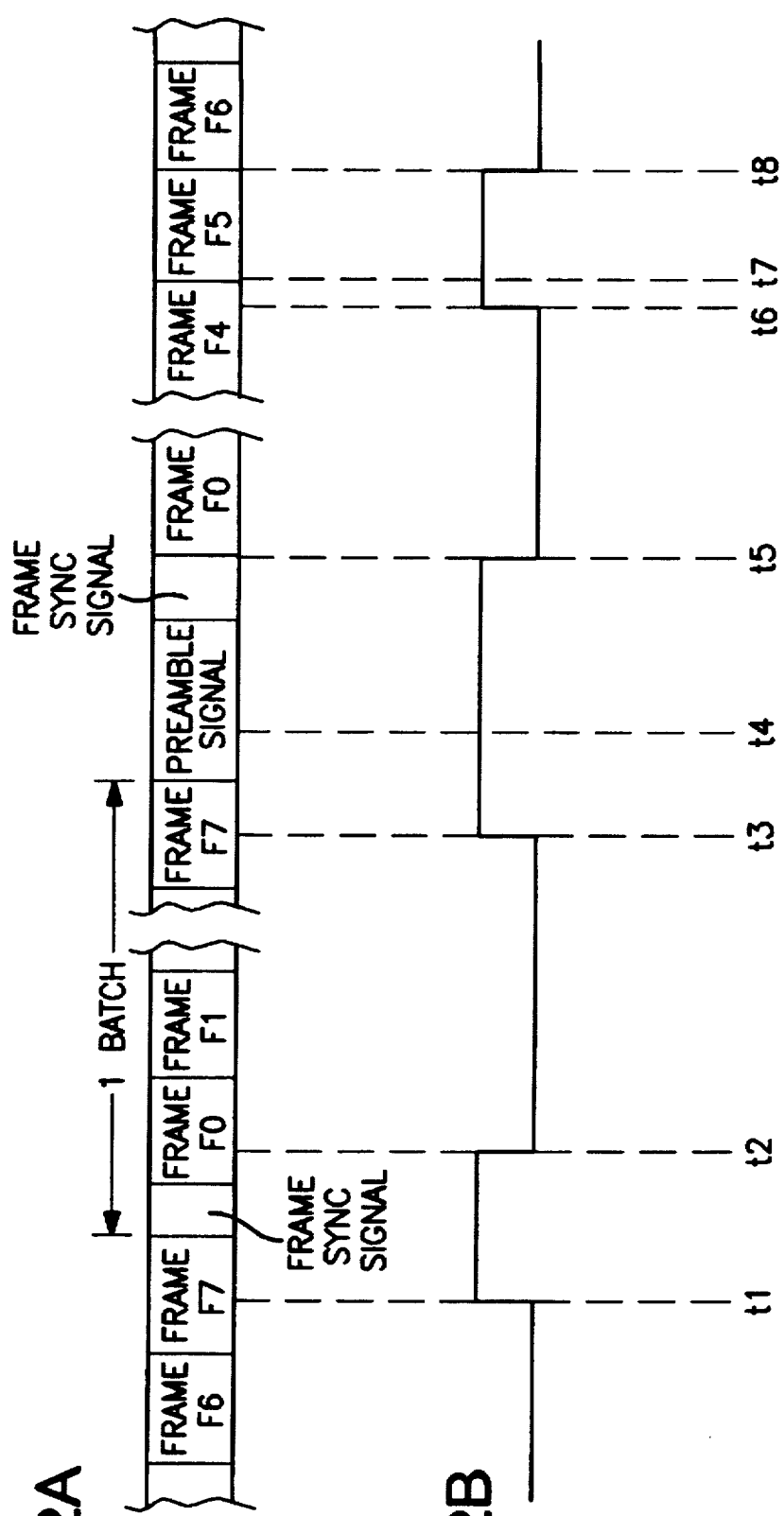
FIG. 2A is a signal format diagram showing an example of a received signal and FIG. 2B is a timing chart of power voltage applied to a radio receiving unit used in the receiver of the present invention.

A description is subsequently given of the receiving operation of a radio signal by the above receiver with reference to FIG. 2A and FIG. 2B. FIG. 2A is a format diagram of an asynchronous POCSAG (Post Office Code Standardization Advisory Group) system signal (CCIR, Rec. 554) which is shown as an example of a radio signal received by the receiver of the present invention. FIG. 2B is a on/off timing chart of power voltage at the radio receiving unit 2 shown in FIG. 1.

In FIG. 2A, one batch consists of a frame sync signal for establishing frame synchronization and frames F0 to F7 including a call signal (ID number). A frame including the call signal (ID number) of the receiver is predetermined. When the receiver receives the predetermined frame, it supplies power voltage to the radio receiving unit 2. Since a predetermined time is required from the time when power voltage is supplied to the radio receiving unit 2 to the time when the radio receiving unit 2 operates properly, power voltage is supplied to the radio receiving unit 2 at a time (t6 of FIG. 2B) a little before the time (t7 of FIG. 2B) when the received frame appears.

As shown in FIG. 2A, a preamble signal is transmitted at predetermined time intervals in this POCSAG signal. This preamble signal is transmitted between a frame F7 and the frame sync signal.

When power voltage is started to be supplied to the radio receiving unit 2 at a time t1, the receiver (control unit 10) sets a preamble search mode to receive part of the frame F7, the frame sync signal and part of a frame F0. When the receiver cannot receive the preamble signal for a predetermined time, it stops supplying power voltage to the radio receiving unit 2 (time t2 of FIG. 2B). Thereafter, at a time t3, the receiver resumes supply of power voltage to the radio receiving unit 2. The receiver repeats supply and stop of power voltage to the radio receiving unit 2 at predetermined time intervals until it receives the preamble signal. In this example, the receiver identifies the currently received radio signal as the preamble signal at a time t4 and establishes a bit cycle with this radio signal.

When the receiver identifies this preamble signal, it sets a frame sync signal search mode to receive a frame sync signal. When the receiver establishes frame synchronization with a radio signal, it stops supply of power voltage to the radio receiving unit 2 (t5 of FIG. 2B).

In the example of FIG. 2B, the receiver receives the frame sync signal right after the preamble signal. However, it may not receive the frame sync signal right after the preamble signal due to deterioration in the field level of a radio signal. When the receiver does not receive the frame sync signal after an elapse of a predetermined time based on the frame sync signal search mode at this time, it stops supply of power voltage to the radio receiving unit 2. After an elapse of the predetermined time, the receiver resumes supply of power voltage to the radio receiving unit 2 and repeats this cycle until it receives the frame sync signal.

When the receiver detects the frame sync signal and establishes frame synchronization with a radio signal, it stops supply of power voltage to the radio receiving unit 2. The receiver starts supply of power voltage to the radio receiving unit 2 at the timing that it receives the frame including its call number (ID number). In FIGS. 2A and 2B, it supplies power voltage to the radio receiving unit 2 at a time t7 when it receives a frame F5. However, since a predetermined time is required until the radio receiving unit 2 operates properly as described above, the receiver starts supply of power voltage to the radio receiving unit 2 at a time t6 a little before a time t7. When the receiver begins to receive the frame F5 at a time t7 and stops the reception of the frame F5 at a time t8, it stops supply of power voltage to the radio receiving unit 2. In this embodiment, the detection of a power voltage is carried out between the times t6 and t7. That is, the receiver applies power voltage to the A/D converter 6 through the input switch circuit 5, the A/D converter 6 converts the power voltage into a digital voltage signal, and the control unit 10 compares the digital voltage signal with a predetermined value. A time period required for the detection of a power voltage does not need to match a time interval between the times t6 and t7 in FIG. 2B.

Figure 3:
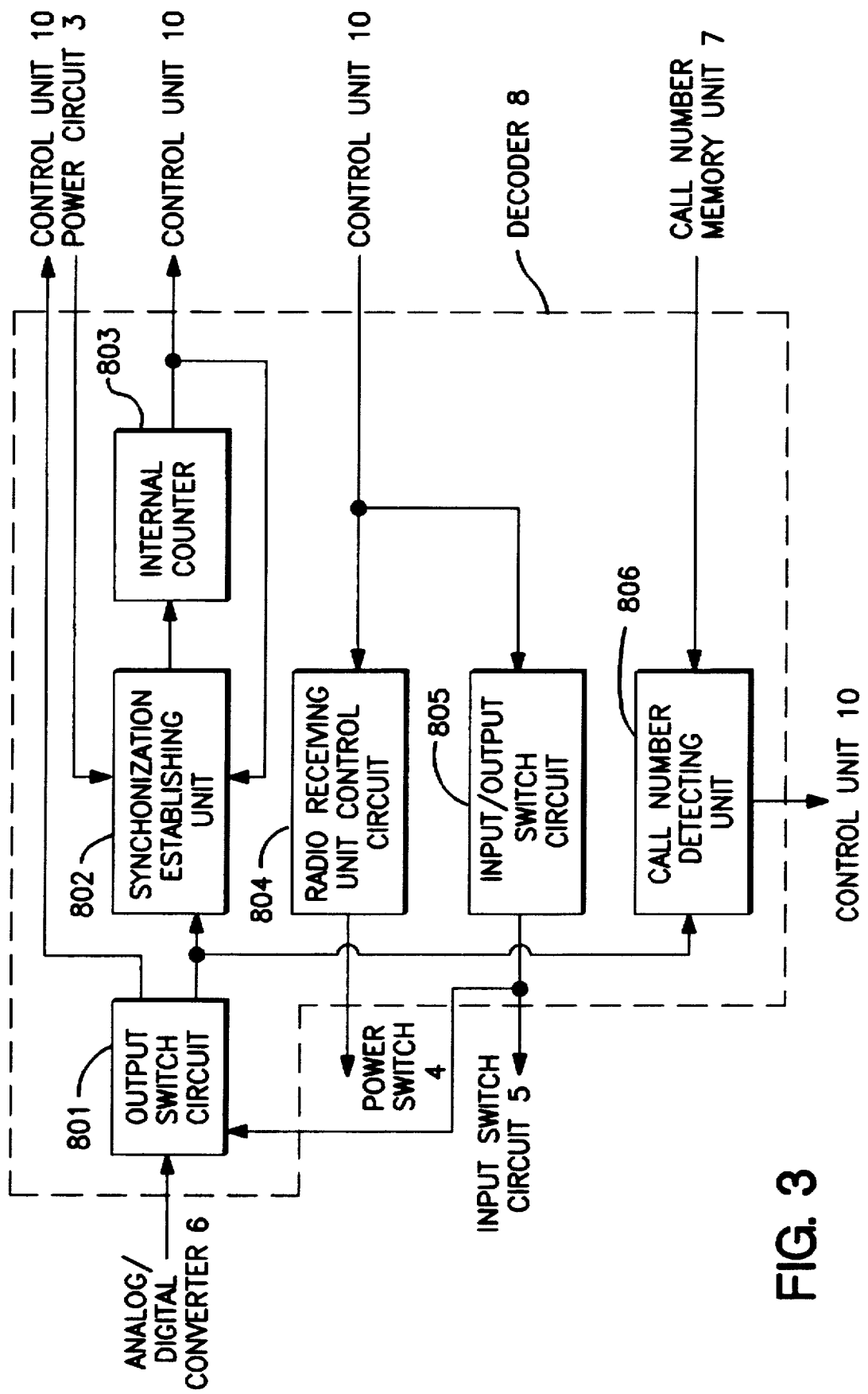
FIG. 3 is a functional block diagram of an example of a decoder shown in FIG. 1.

A description is subsequently given of the constitution and operation of the decoder 8 shown in FIG. 1 with reference to FIG. 3.

The constitution of the decoder 8 is first explained. An output switch circuit 801 outputs the digital voltage signal to the control unit 10 or the digital demodulated signal to a synchronization establishing unit 802 in response to a switch signal from an input/output switch circuit 805.

The synchronization establishing unit 802 detects the preamble signal and the frame sync signal included in the demodulated digital signal and sets an the internal counter 803 to a predetermined value to establish bit synchronization and frame synchronization. The internal counter 803 sets a predetermined count value according to a signal from the power circuit 3 and the synchronization establishing unit 802, counts down and resets a count value when its count value becomes zero. The count value counted by the internal counter 803 is different according to a preamble search mode for searching the preamble signal, a frame sync signal search mode for retrieving a frame sync signal and a receiving mode for retrieving the call number of the receiver after synchronization with a radio signal has been established. This is because time periods for supplying and stopping power voltage to the radio receiving unit 2 differ in these modes.

A radio receiving unit control circuit 804 controls the power switch 4 in response to a control signal from the control unit 10.

The input/output switch circuit 805 outputs a switch signal to the input switch circuit 5 in response to a control signal from the control unit 10 and selects a signal from the input switch circuit 5.

A call number detection unit 806 detects a call number (ID number) included in the demodulated digital signal from the output switch circuit 801 and compares it with the call number (ID number) of the receiver read from the call number (ID number) memory unit 7. The call number detection unit 806 outputs a match signal to the control unit 10 when these numbers match.

A description is subsequently given of the operation of the decoder 8.

When the synchronization establishing unit 802 receives a start signal from the power circuit 3, it sets in the internal counter 803 a count number equivalent to a time period (Ta) for supplying power voltage to the radio receiving unit 2 in the preamble signal search mode. When the internal counter 803 has been set, the control unit 10 outputs a control signal to the radio receiving unit control circuit 804 and the input/output switch circuit 805. Thereby, the radio receiving unit control circuit 804 outputs the control signal to the power switch 4 and supplies power voltage to the radio receiving unit 2. The input/output switch circuit 805 outputs a switch signal to the input switch circuit 5 and the output switch circuit 801. In response to this switch signal, the input switch circuit 5 outputs a demodulated signal to the A/D converter 6 and the output switch circuit 801 outputs the demodulated digital signal converted by the A/D converter 6 to the synchronization establishing unit 802.

The synchronization establishing unit 802 judges whether or not the preamble signal included in the demodulated digital signal is detected. If the preamble signal is not detected when the internal counter 803 counts down the above set value and the the count number becomes zero, that is, if the preamble signal is not detected even when power voltage is supplied to the radio receiving unit 2 for the predetermined time period (Ta) to receive a radio signal, the synchronization establishing unit 802 sets in the internal counter 803 a count number equivalent to a time period (Tb) for stopping supply of power voltage to the radio receiving unit 2 in the preamble signal search mode. In response to this setting operation, the control unit 10 outputs a control signal to the radio receiving unit control circuit 804 which in turn outputs the control signal to the power switch 4 to stop supply of power voltage to the radio receiving unit 2.

The internal counter 803 counts the above count number equivalent to the time period (Tb) for stopping supply of power voltage to the radio receiving unit 2. When the count number becomes zero, a count value equivalent to the above time period Ta is set by the synchronization establishing unit 802. At this point, the control unit 10 outputs a control signal to the radio receiving unit control circuit 804 which in turn outputs the control signal to the power switch 4 to start supply of power voltage to the radio receiving unit 2. The input/output switch circuit 805 outputs a switch signal to the input switch circuit 5 and the output switch circuit 801. In response to this switch signal, the input switch circuit 5 outputs a demodulated signal to the A/D converter 6, and the output switch circuit 801 outputs a demodulated digital signal converted by the A/D converter 6 to the synchronization establishing unit 802.

The decoder 8 repeats the above operation until a preamble signal is detected.

When the synchronization establishing unit 802 detects the preamble signal, it establishes bit synchronization between a radio signal and the internal counter 803, outputs a preamble detection signal, and sets in the internal counter 803 a count number equivalent to a time period (Tc) for supplying power voltage to the radio receiving unit 2 in a frame sync signal search mode.

Thereafter, the synchronization establishing unit 802 judges whether or not a frame sync signal is detected. If the frame sync signal is not detected when the internal counter 803 counts down the above set value and its count number becomes zero, that is, if the frame sync signal is not detected even when power voltage is supplied to the radio receiving unit 2 for the predetermined time period (Tc) to receive a radio signal, the synchronization establishing unit 802 sets in the internal counter 803 a count number equivalent to a time period (Td) for stopping supply of power voltage to the radio receiving unit 2 in the frame sync signal search mode. In response to this setting operation, the control unit 10 outputs a control signal to the radio receiving unit control circuit 804 which in turn outputs the control signal to the power switch 4 to stop supply of power voltage to the radio receiving unit 2.

The internal counter 803 counts the above count number equivalent to the time period (Td) for stopping supply of power voltage to the radio receiving unit 2. When the count number becomes zero, a count value equivalent to the above time period Tc is set by the synchronization establishing unit 802. At this point, the control unit 10 outputs a control signal to the radio receiving unit control circuit 804 which in turn outputs the control signal to the power switch 4 to start supply of power voltage to the radio receiving unit 2. The input/output switch circuit 805 outputs a switch signal to the input switch circuit 5 and the output switch circuit 801. In response to this switch signal, the input switch circuit 5 outputs a demodulated signal to the A/D converter 6 and the output switch circuit 801 outputs a demodulated digital signal converted by the A/D converter 6 to the synchronization establishing unit 802.

The decoder 8 repeats the above operation until a frame sync signal is detected.

When the synchronization establishing unit 802 detects the frame sync signal, it establishes frame synchronization between a radio signal and the internal counter 803, outputs a frame synchronization detection signal, and sets in the internal counter 803 a count number equivalent to a time period (Te) for stopping supply of power voltage to the radio receiving unit 2 in a receiving mode. This time period Te is equivalent to a time interval from a time t5 to a time t6. At this point, the control unit 10 outputs a control signal to the radio receiving unit control circuit 804 which in turn outputs the control signal to the power switch 4 to stop supply of power voltage to the radio receiving unit 2.

When the internal counter 803 counts down a count number equivalent to the time period Te and its count number becomes zero, the synchronization establishing unit 802 sets in the internal counter 803 a count number equivalent to a time period (Tf) for supplying power voltage to the radio receiving unit 2 to detect a power voltage. At this point, the control unit 10 outputs a control signal to the radio receiving unit control circuit 804 and the input/output switch circuit 805. The radio receiving unit control circuit 804 outputs the control signal to the power switch 4 to start supply of power voltage to the radio receiving unit 2. The input/output switch circuit 805 outputs a switch signal to the input switch circuit 5 and the output switch circuit 801. In response to this switch signal, the input switch circuit 5 outputs power voltage to the A/D converter 6 and the output switch circuit 801 outputs a digital voltage signal converted by the A/D converter 6 to the control unit 10. The above time period Tf is equivalent to a time interval between a time t6 and a time t7 in FIG. 2B.

When the internal counter 803 counts down the count number equivalent to the above time period Tf and its count number becomes zero, the synchronization establishing unit 802 sets in the internal counter 803 a count number equivalent to a time period (Tg) for supplying power voltage to the radio receiving unit 2 to detect the call number (ID number) of the receiver in the receiving mode. At this point, the control unit 10 outputs a control signal to the radio receiving unit control circuit 804 and the input/output switch circuit 805. The radio receiving unit control circuit 804 outputs the control signal to the power switch 4 to continue supply of power voltage to the radio receiving unit 2. The input/output switch circuit 805 outputs a switch signal to the input switch circuit 5 and the output switch circuit 801. In response to this switch signal, the input switch circuit 5 outputs a demodulated signal to the A/D converter 6 and the output switch circuit 801 outputs a demodulated digital signal converted by the A/D converter 6 to the call number detecting unit 806. The above time period Tg is equivalent to a time interval between a time t7 and a time t8 in FIG. 2B.

The call number detecting unit 806 detects an call number (ID number) included in the digital demodulated signal, reads the call number (ID number) of the receiver from the call number memory unit 7, and judges whether or not they match. When these call numbers (ID numbers) match, the call number detecting unit 806 outputs a match signal to the control unit 10.

When the internal counter 803 counts down the count number equivalent to the above time period Tg and its count number becomes zero, the synchronization establishing unit 802 sets in the internal counter 803 a count number equivalent to a time period (Th) until the next frame F5 is received in the receiving mode. At this point, the radio receiving unit control circuit 804 outputs a control signal to the power switch 4 to stop supply of power voltage to the radio receiving unit 2.

The decoder 8 repeats the above operation until supply of power voltage from the power circuit 3 is stopped.

A description is subsequently given of the operation of the receiver and the power voltage detection operation of the present invention with reference to operation flow charts of FIG. 4 and FIG. 5.

Figure 4A:
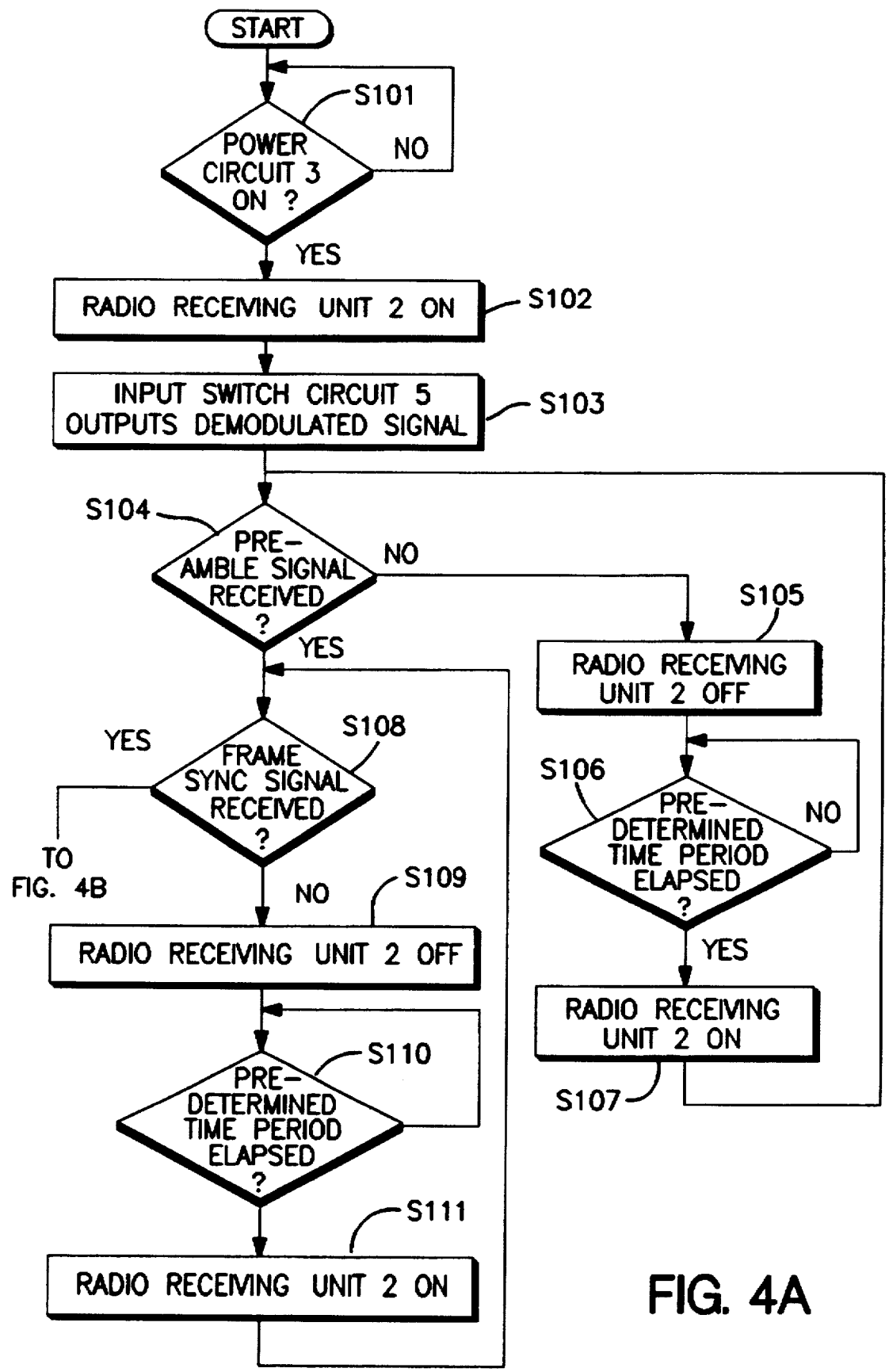
FIG. 4 and FIG. 5 are flow charts for explaining the operation of the receiver of the present invention.
Figure 4B:
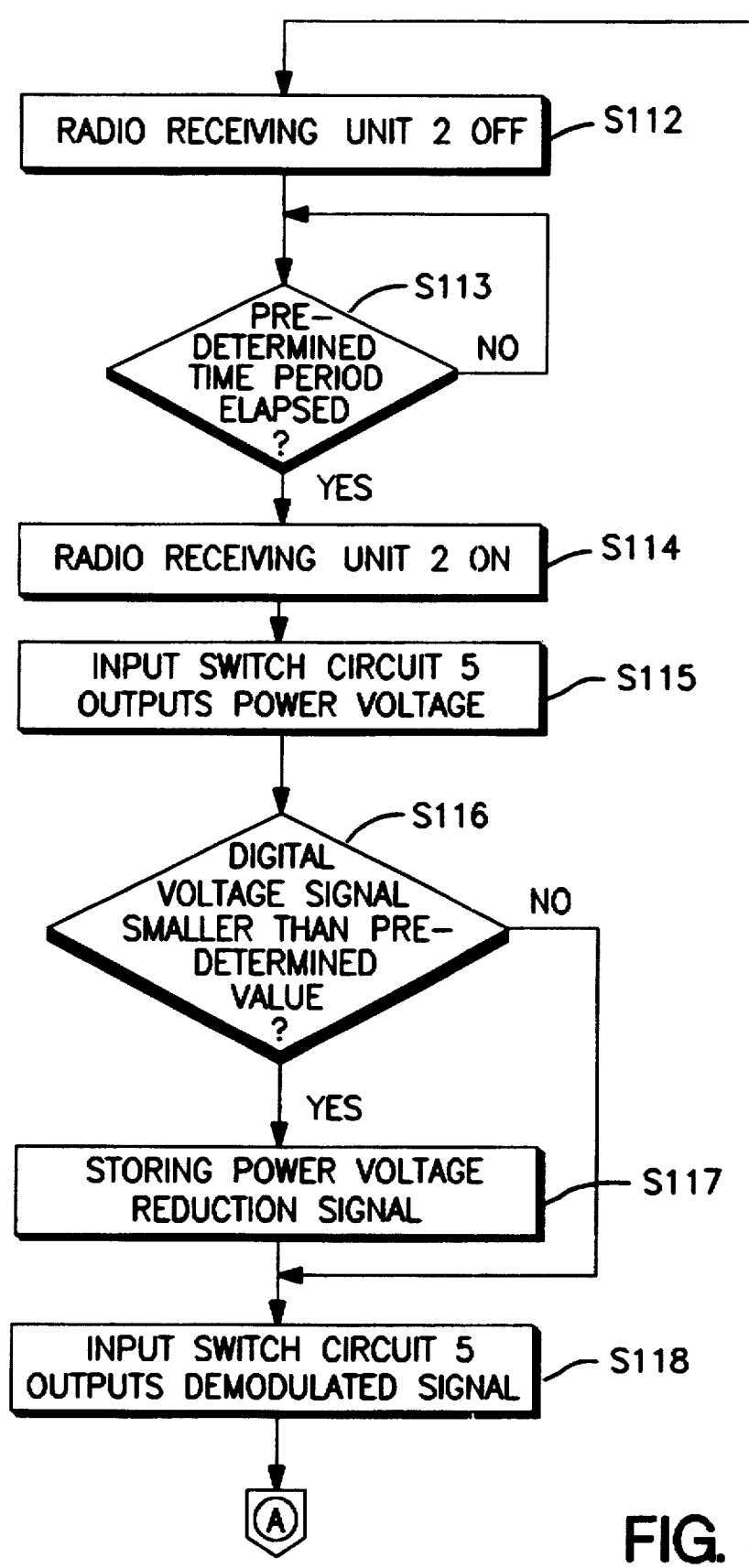
Figure 5:
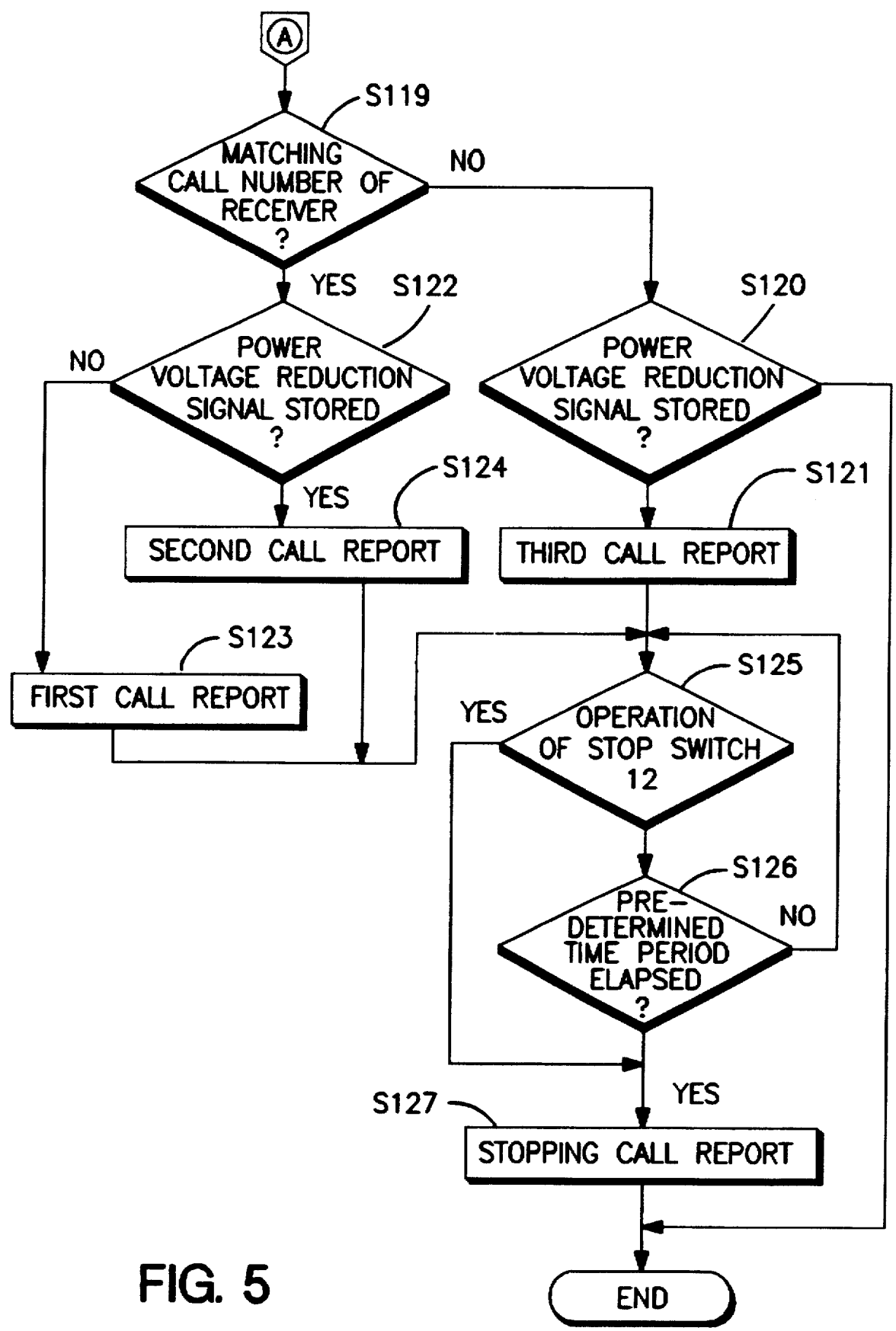

In FIG. 4, the decoder 8 judges whether the power circuit 3 is turned on (step 101). When the power circuit 3 is turned on, the decoder 8 turns on the power switch 4 and the radio receiving unit 2 (step 102). When the power circuit 3 is not turned on, the routine returns to step 101 to wait for the power circuit 3 to be turned on.

When the power switch 4 is turned on and power voltage is supplied to the radio receiving unit 2, the decoder 8 controls the input switch circuit 5 to select a demodulated signal from the radio receiving unit 2 (step 103). When the decoder 8 receives a digital demodulated signal from the A/D converter 6, it judges whether the digital demodulated signal includes a preamble signal (step 104). If the preamble signal cannot be detected even when this digital demodulated signal is input for the predetermined time period (Ta), supply of power voltage to the radio receiving unit 2 is stopped (step 105). After an elapse of the predetermined time period (Tb) (step 106), the decoder 7 resumes supply of power voltage to the radio receiving unit 2 (step 107).

The receiver repeats the above processing from step 104 to step 107 until the preamble signal is detected.

When the preamble signal is detected, the decoder 8 establishes bit synchronization with a radio signal and judges whether a frame sync signal is included in the digital demodulated signal (step 108). When the frame sync signal cannot be detected during the predetermined time period (Tc) after the detection of the preamble signal, the decoder 8 stops supply of power voltage to the radio receiving unit 2 (step 109). After an elapse of the predetermined time period (Td) (step 110), the decoder 8 resumes supply of power voltage to the radio receiving unit 2 (step 111).

The receiver repeats the above processing from step 108 to step 111 until the frame sync signal is detected.

When the frame sync signal is detected, the decoder 8 establishes bit synchronization with a radio signal and stops supply of power voltage to the radio receiving unit 2 (step 112). The decoder 8 begins to supply power voltage to the radio receiving unit 2 at a predetermined time (step 113) a little (more than about several hundreds of milliseconds) before the reception of a frame including the call number of the receiver (step 114). The decoder 8 performs the processing of step 113 until the above predetermined time.

When power voltage is supplied to the radio receiving unit 2 (step 114), the decoder 8 switches the output of the input switch circuit 5 to power voltage (step 115). The A/D converter converts the power voltage into a digital voltage signal and outputs it to the decoder 8 which in turn outputs this digital voltage signal to the control unit 10. The control unit 10 compares this digital voltage signal with a predetermined value (step 116). When the digital voltage signal is smaller than the predetermined value, the control unit 10 stores a power voltage reduction signal (step 117). When the digital voltage signal is larger than the predetermined value, the routine proceeds to step 118.

The above processing from step 115 to step 117, that is, the processing of detecting a power voltage is carried out during a period (a time margin for starting the radio receiving unit 2) from a predetermined time a little (more than about several hundreds of milliseconds) before the reception of the above frame including the call number of the receiver to a time when the frame including the call number of the receiver is received. At the time when the frame including the call number of the receiver is received, the output of the input switch circuit 5 is switched to a demodulated signal (step 118).

Thereafter, the decoder 8 detects the call signal (ID number) included in the frame of the received digital demodulated signal and compares it with the call number (ID number) of the receiver stored in the call number memory unit 7 (step 119).

When these numbers do not match in step 119, the control unit 10 confirms that a match signal is not input during a predetermined time period and judges whether the power voltage reduction signal is stored (step 120). The control unit 10 outputs a third call report drive signal when the power voltage reduction signal is stored so that the call reporting unit 11 makes a third call report (step 121). This third call report is a call report alarming that power voltage is decreasing. not accompanied by a call to the receiver. On the other hand. when the power voltage reduction signal is not stored. the control unit 10 terminates processing.

When the detected call signal and the call number (ID number) of the receiver match in step 119. the decoder 8 outputs a match signal to the control unit 10. In response to this match signal. the control unit 10 judges whether the power voltage reduction signal is stored (step 122). When the power voltage reduction signal is not stored. the control unit 10 outputs a first call report drive signal so that the call reporting unit 11 makes a first call report (step 123). This first call report is a call report alarming that power voltage is not decreasing. accompanied by a call to the receiver. Meanwhile. when the power voltage reduction signal is stored. the control unit 10 outputs a second call report drive signal so that the cal reporting unit 11 makes a second call report (step 124). This second call report is a call report alarming that power voltage is decreasing. accompanied by a call to the receiver.

When the stop switch 12 is operated while the first to third call reports are made (step 125). the call reports are stopped (step 127). When the stop switch 12 is not operated. the control unit 10 judges whether a predetermined time period has elapsed from the start of a call report (step 126). When this predetermined time period has elapsed. the call report is stopped (step 127). When the predetermined time has not been elapsed. the routine returns to step 125.

In the above embodiment. a power voltage is detected during the warm-up time of the radio receiving unit 2 (a time margin for starting the radio receiving unit 2) right before the reception of a frame. The power voltage can be detected any time except the detection or retrieval time of the preamble signal and the frame sync signal and the detection time of the call number.

In the above embodiment. a POCSAG signal format is used as an example of the received signal. However. the present invention does not limit a received signal format and can be applied to other sync or async signal formats.

An alarm for decreasing power voltage can be given separately from the time of making a call report. Further. a reduction in power voltage may be detected by comparing with a plurality of reference values and not one reference value. and an alarm may be given based on a plurality of patterns.

As described in the above embodiment. the radio selective call receiver having a function to detect a power voltage of the present invention makes it possible to replace an A/D converter for detecting a power voltage and a shaping circuit of the prior art with a single digital signal converter. that is. an A/D converter 6. thereby simplifying circuit configuration and saving power.

While the present invention has been described in connection with certain preferred embodiments. it is to be understood that the subject matter encompassed by the present invention is not limited to those specific embodiments. On the contrary. it is intended to include all alternatives. modifications and equivalents as can be included within the spirit and scope of the following claims.

What is claimed is:

1. A radio selective call receiver having a function to detect a power voltage comprising:

radio receiving means for receiving and demodulating a radio signal and outputting the demodulated signal;

an input switch circuit for selecting either the demodulated signal or power voltage and applying its selected signal or voltage to an analog/digital converter;

the analog/digital converter for converting the demodulated signal into a digital demodulated signal when it receives the signal from the input switch circuit and the power voltage into a digital voltage signal when it receives the power voltage;

detecting means for detecting a frame including the call number of the receiver from the digital demodulated signal from the analog/digital converter;

call reporting means for making a call report when the detection means detects the call number of the receiver;

a voltage detection circuit for detecting that the digital voltage signal falls below a predetermined voltage value; and alarm means for alarming that the digital voltage signal falls below the predetermined voltage value.

2. A radio selective call receiver having a function to detect a power voltage according to claim 1 which further comprises: switch means. connected to a power circuit. for supplying and stopping supply of power voltage to the radio receiving means; and control means for controlling the switch means.

3. A radio selective call receiver having a function to detect a power voltage according to claim 1. wherein the call reporting means gives an alarm for a reduction in the voltage value.

4. A radio signal receiving and reporting method comprising the steps of:

applying power voltage to a radio receiving unit to retrieve or detect a call number during a period in which a radio signal is demodulated. the demodulated signal is converted into a digital demodulated signal by an analog/digital converter and a specific signal or frame is retrieved or detected from the signal;

applying power voltage to the analog/digital converter during a period other than the above period to convert it into a digital voltage signal and detecting whether the voltage signal falls below a predetermined voltage value;

making a call report when a call number matches the call number of the receiver included in the specific frame of the digital demodulated signal; and giving an alarm when the digital voltage signal falls below a predetermined voltage value.

5. A radio signal receiving and reporting method according to claim 4. wherein when a desired signal or frame cannot be detected from the digital demodulated signal during a predetermined time period. application of power voltage to the radio receiving unit is suspended for a predetermined time and then power voltage is applied again to the radio receiving unit for the predetermined time period to retrieve or detect the specific signal or frame.

6. A radio signal receiving and reporting method according to claim 4. wherein power voltage is supplied to the radio receiving unit for a predetermined time period right before a time when a frame including the call number of the receiver is detected.

7. A radio signal receiving and reporting method according to claim 4. wherein a time period during which power voltage is applied to the analog/digital converter to be converted into a digital voltage signal is a predetermined time period right before a time when a frame including the call number of the receiver is detected.

8. A radio signal receiving and reporting method according to claim 4. wherein an alarm informing that the digital voltage signal falls below a predetermined voltage value is given at the time of making a call report.

9. A radio signal receiving and reporting method according to claim 4. wherein an alarm informing that the digital voltage signal falls below a predetermined voltage value is given at a time other than the time of making a call report.

* * * * *